S. HART.
Bee Hive.
No. 3,971. Patented March 26, 1845.
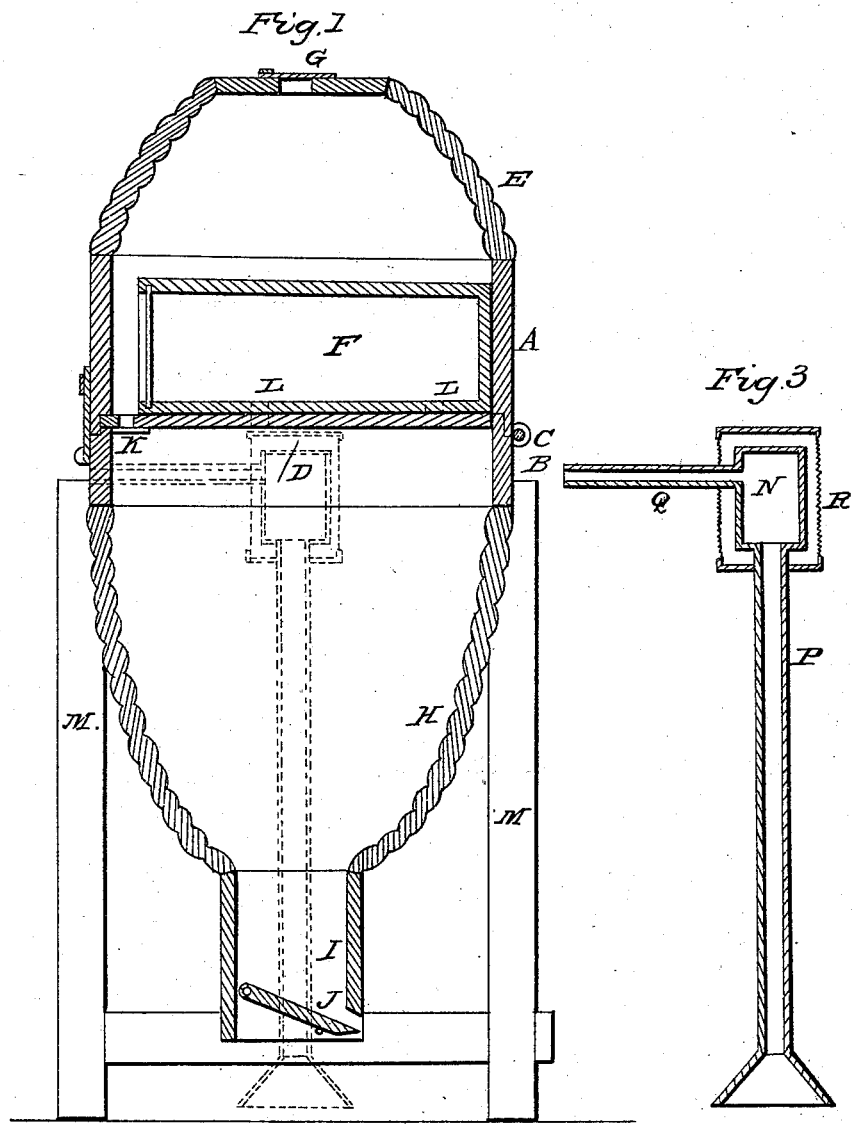

UNITED STATES PATENT OFFICE.

SILAS HART, OF NEW HAVEN, NEW YORK.

BEEHIVE.

Specification of Letters Patent No. 3,971, dated March 26, 1845.

*To all whom it may concern:*

Be it known that I, SILAS HART, of New Haven, in the county of Oswego and State of New York, have invented a new and useful Improvement in the Construction of Beehives, which is described as follows, reference being had to the annexed drawings of the same, making part of this specification.

Figure 1 is a vertical section of the hive. Fig. 2 is a perspective view of the hive. Fig. 3 is a vertical section of the warmer.

This hive consists of two rectangular boxes A and B open at either end, the upper box A being placed upon the top of the lower one B, to which it is connected by a hinge C, so that they can be opened or closed at pleasure—the lower box being closed or covered on the top by a loose horizontal perforated board D which divides the upper from the lower box. The upper box being covered by a plaited straw dome E of sufficient capacity—said dome being connected to the upper edges of the upper hinged box by sewing or otherwise fastening its base to the box by strong twine or other means—the top of the dome being perforated with an aperture for ventilating the hive opened or closed at pleasure by means of a valve G, said dome being made of a hemispherical, pyramidal, or other shape.

To the lower edges of the lower box is fastened an inverted dome H constructed and attached in the manner of the dome E having a square aperture in the center into which is inserted and secured a vertical tube I through which the bees pass in entering the hive, closed at the lower end by an inclined board J except a space at which the bees enter when the said board is extended to form a ledge for the bees to light upon, which board is arranged at such an angle of inclination that any insect or dirt falling upon it will roll from the hive. The bottoms of the drawers are perforated with apertures L represented by dotted lines corresponding with the apertures in the horizontal dividing board aforesaid through which the bees ascend to the interior of the drawers. There is another aperture in said board covered with a sheet of wire gauze K for ventilating the hive. The hive when completed is suspended by hanging strips and cleats attached to the lower box from the under side of the covering for the hive, or in any convenient place or the hive may be supported upon a light frame M. The drawers are glazed for the purpose of seeing the operation of the bees and made movable for the purpose of removing the honey by taking off the bottom which is held by tacks to the sides. When the said drawers are filled, the bees will of course continue their operation in the straw base of the hive. To remove the drawers it is only necessary to raise one side of the upper box. When the drawers filled with the production of the bees are removed from the hive and empty boxes put in their places, the young bees in the comb of the filled drawers will return to the hive and resume the work of filling the empty drawers. In this manner the bees may be kept constantly at work.

By arranging the inverted straw dome in the manner above described so as to contract it where it unites with the vertical wood tube or trunk I to a very small space the bees will be caused to cluster around the lower or small end of the comb at the upper end of the vertical tube through which they enter the hive, at which place the bees will be enabled effectually to guard the hive from the intrusion of all destructive insects. And by having the dome of the hive capacious the bees may be easily shifted to a new hive for the purpose of cleaning the old hive or for any other purpose—it being only necessary to remove the boxes or drawers from the upper part of the hive and then allow the bees to work therein and fill the dome, which is then removed by separating the hinges and placing it upon a new base into which the bees will work and when the base is partly filled the apiarian will introduce fumes of tobacco through the aperture in the top of the dome which will drive the bees into the base and when therein he will remove the dome and insert the drawers empty and replace the dome. To clean the base the bees must be caused to pass into the dome and carry on their operations and when in a proper state for removal the dome must be removed to a new base and the old base must be cleaned. The dome may then be restored to its former position and the bees caused to resume their usual operation.

In order to prevent the condensed perspiration of the bees which accumulates in the hive in the state of water from freezing around the bees and destroying them and for preventing the watery particles freezing to the upper part of the base in the form of icicles and crystals, I introduce into the hive a warmer or drum N having a vertical pipe P leading into it from below made with a funnel shaped mouth for conducting the heat from a furnace to the drum and thence by a horizontal pipe Q from the drum to the atmosphere, which drum and pipes confine the gas and allow the heat to circulate in the hive, being surrounded by reticulated gauze R to prevent the bees or the comb coming in contact with the drum.

What I claim as my invention and which I desire to secure by Letters Patent is—

The mode herein described of warming the bees in the hive—that is to say I claim in combination with the hive, the hot air tube, in the lower part of the hive arranged with reference to the entrance as described, its upper part provided with a drum surrounded with wire gauze, the whole arrangement of parts of the said heating apparatus and purpose of the same, being as herein described.

SILAS HART.

Witnesses:
EDW. MAHER,
WM. P. ELLIOT.